Nov. 17, 1970    L. T. REES    3,541,420
VOLTAGE CONVERTER AND REGULATOR
Filed March 27, 1968
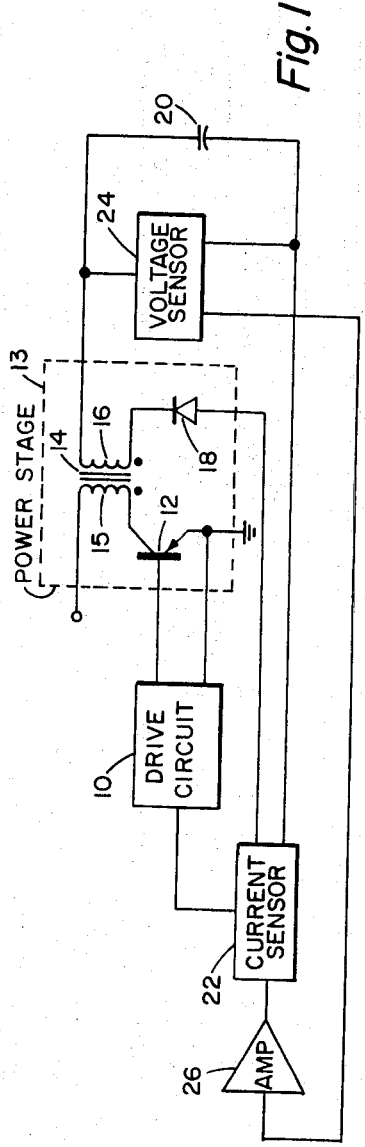
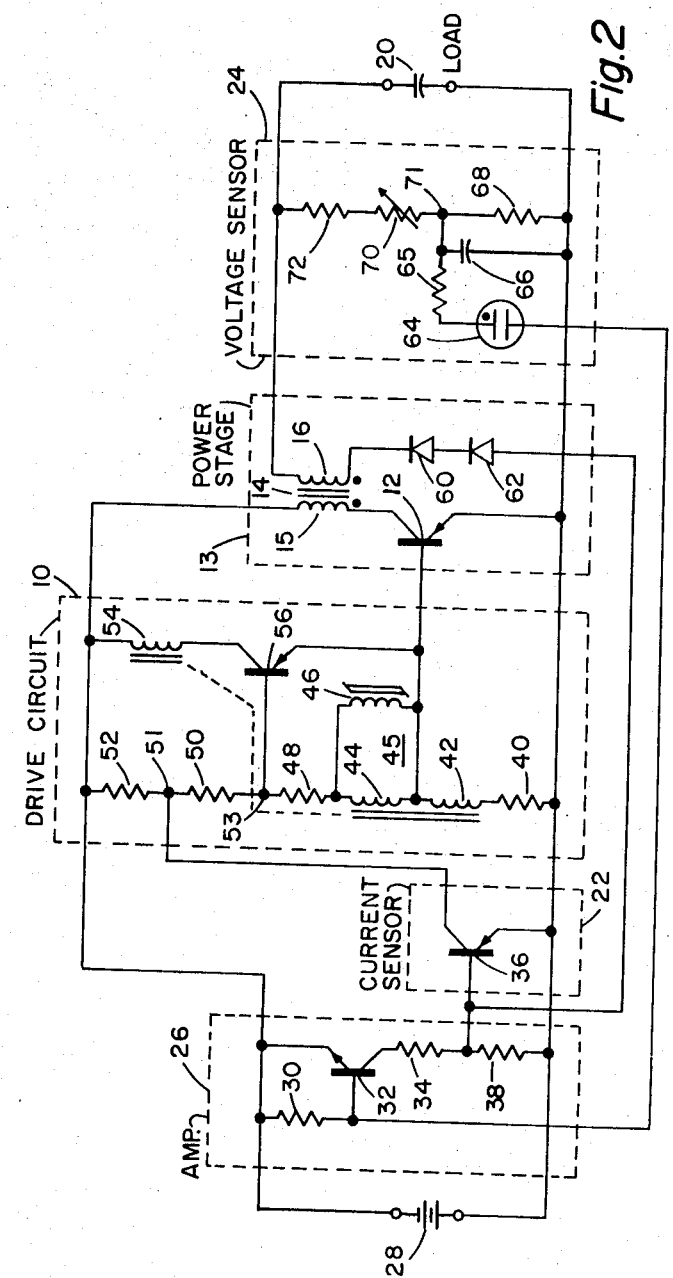
INVENTOR.
Lynn T. Rees
BY
ATTY'S.

United States Patent Office 3,541,420
Patented Nov. 17, 1970

3,541,420
VOLTAGE CONVERTER AND REGULATOR
Lynn T. Rees, Mesa, Ariz., assignor to Motorola, Inc., Franklin Park, Ill., a corporation of Illinois
Filed Mar. 27, 1968, Ser. No. 716,468
Int. Cl. H02m *3/32;* H02p *13/20, 13/22*
U.S. Cl. 320—1                                   8 Claims

ABSTRACT OF THE DISCLOSURE

A DC to DC converter circuit for converting the low voltage of a small storage cell to a high level charging voltage for a capacitive load. The circuit includes a variable duty-cycle drive circuit connected to a low voltage storage cell and provides output pulses for driving a power stage. The power stage interconnects the drive circuit to the capacitive load and provides charging current to the capacitive load. A voltage sensing means is connected between the capacitive load and the drive circuit and senses the voltage across said capacitive load to control the on and off time of the drive circuit to provide output voltage regulation. A current sensing means is connected between the capacitive load and the drive circuit and provides a duty cycle control signal to the drive circuit in response to charging current through the capacitive load.

This invention relates generally to voltage conversion circuitry and more particularly to a DC to DC converter for efficiently charging a high voltage capacitive load from a relatively low voltage storage cell.

BACKGROUND OF THE INVENTION

Prior art DC to DC converters which were used to charge storage capacitors to relatively high DC voltages were inefficient in their operation and required relatively high level DC supplies, e.g., storage cells, from which to operate. For example, a DC storage cell of approximately six volts was required in combination with other prior DC to DC conversion circuitry to charge a storage capacitor to approximately 400 volts. This prior art conversion circuitry is the type which operates, for example, on a small dry cell battery to charge a capacitor in flash camera circuitry to a level sufficiently high to fire the flashtube of the camera.

The present invention has been constructed to overcome the above and other disadvantages of prior art DC to DC converter circuitry and operates at a higher efficiency and from a lower voltage DC supply than any known prior art converter circuits.

SUMMARY OF THE INVENTION

An object of this invention is to provide a new and improved DC to DC converter circuit for efficiency charging storage capacitors.

Another object of this invention is to provide a new and improved DC to DC converter circuit which may be operated from a very low level DC supply voltage.

A feature of the present invention is the provision of a voltage sensor which is connected between a capacitive load and a variable duty cycle drive circuits. The voltage sensor responds to the voltage across a capacitive load to control the on and off time of the drive circuit.

Another feature of the present invention is the provision of a feedback controlled oscillator within the drive circuit for providing a driving signal to a power stage of the converter. The power stage in turn provides a charging current to the capacitive load.

Another feature of the present invention is the provision of a current sensor connected between the power stage of the converter and the drive circuit. The current sensor responds to charging current through the capacitive load for varying the duty cycle of the drive circuit.

Another feature of the present invention is the provision of an energy storage inductance means connected to a power transistor within the feedback controlled oscillator. Such inductance means provides a rapid turn on and turn off of the oscillator in response to signals from the voltage and current sensors.

Another feature of the present invention is the provision of a saturable magnetic core to control the on time of each cycle of the drive oscillator.

These and other objects and features of this invention will become more readily understood from the following description of the accompanying drawings.

IN THE DRAWINGS

FIG. 1 illustrates one circuit embodiment of the present invention, partly in schematic and partly in block diagram form, and FIG. 2 illustrates a complete schematic diagram of the invention which corresponds to the block and schematic portions of FIG. 1.

DESCRIPTION OF THE INVENTION

Briefly described, the present invention is directed to a DC to DC converter including a variable duty cycle drive circuit connected to a low voltage storage cell. The drive circuit produces output drive pulses to a power stage and the power stage is in turn connected to a capacitive load to charge same up to a predetermined voltage. A voltage sensor is connected to the capacitive load and responds to the voltage thereacross to control the on-off time of the drive circuit. A current sensing means is connected between the capacitive load and the drive circuit and controls the duty cycle (off time of each cycle) of the drive circuit in response to charging current through the capacitive load.

The duty cycle of the drive oscillator is controlled as follows for each cycle of oscillation. The "on" portion of the cycle is determined by inductor 46 and the off time is determined by current sensor 22, i.e., as long as a detectable current is flowing in the load circuit, the drive circuit 10 will be "off." As soon as the load current ceases at the end of a cycle, drive circuit 10 commences a new cycle. The "off" portion of each cycle varies with voltage across the load capacitor 20.

If the voltage on capacitor 20 is allowed to get sufficiently high, the current sensor will not retard drive oscillator "off" time and drive circuit 10 will operate at its "free run" frequency. When free running, the off time is determined by the reset time of saturable inductor 46. As embodied therein, drive oscillator 10 will approach its free run duty cycle as load capacitor 20 approaches its fully charged condition just prior to turn off via voltage sensor 24.

Referring now to the drawings in detail, there is shown in FIG. 1 a variable duty cycle drive circuit 10 connected to a power transistor 12 in a power stage 13. The power stage 13 includes a transformer 14 having input and output windings 15 and 16 respectively thereon. A diode rectifier 18 is connected to the output winding 16 and provides a rectified charging current to a capacitive load 20.

Energy is transferred from the battery 28 to the capacitor 20 as follows: During the "on" portion of a cycle, energy is stored in inductor 15. Then during the "off" portion of the cycle this energy is transferred to the load capacitor 20.

A voltage sensor 24 is connected to the capacitive load 20 and responds to the voltage across capacitor 20 to provide an on-off signal which is applied via amplifier 26 and transistor 36 to the drive circuit 10. A current sensor 22 is connected in series with the capacitive load 20 and transformer winding 16 and responds to the charging current through capacitor 20 to control the duty cycle of the drive circuit 10. The voltage sensor 24 provides on and off control for the drive circuit 10 in response to the voltage across capacitor 20 and the current sensor 22 varies the duty cycle of the drive circuit 10 in proportion to the voltage present on capacitor 20. When the load capacitor voltage is relatively low, the current sensor 22 will hold the drive circuit 10 at a low duty cycle, and when the capacitor voltage is high, the current sensor 22 will increase the duty cycle of drive circuit 10.

Referring now to FIG. 2, the various components of this figure will be initially identified and thereafter the operation of the converter shown in FIG. 2 will be described in detail. The corresponding components and stages FIGS. 1 and 2 have been identified with like reference numerals.

The drive circuit 10 includes a PNP transistor 56 to which a network of divider resistors 48, 50, and 52 are connected. An inductive coupling means 45 is connected in the base emitter circuit of the transistor 56 and includes an inductor 44 and a saturable inductor 46 connected in parallel. The function of these two inductors will be further described below with reference to the description of circuit operation. An inductor 42 and resistor 40 interconnect the inductors 44 and 46 to a point of reference potential.

The emitter of the PNP transistor 56 is connected to the base of a drive transistor 12 in the power stage 13. The power stage 13 in FIG. 2 differs from the power stage 13 in FIG. 1 only in that a pair of rectifiers 60 and 62 are used in FIG. 2 to provide a desirable high level of rectification in this stage.

The voltage sensor 24 includes a resistive divider network of resistors 68, 70, and 72 and a capacitor 66 interconnects midpoint 71 of resistors 68 and 70 to a point of reference potential. Capacitor 66 is connected to a negative resistance element 64, and element 64 may, for example, be a neon tube. A neon tube has been found to work extremely well as the negative resistance element 64 in the embodiment shown in FIG. 2. Resistor 65 limits the peak current in element 64 so that element does not become overstressed and change its characteristics.

The negative resistance element 64 is connected directly to the base of amplifier transistor 32 in the amplifier stage 26. The amplifier transistor 32 is biased by a low voltage storage battery 28, and battery 28 may, for example, be a 2-volt nickel-cadmium storage cell. A base bias resistor 30 interconnects the base of the amplifier transistor 32 to the negative terminal of the battery 28, and a current limiting resistor 34 interconnects the collector of transistor 32 to the base of a current sensing transistor 36. Transistor 36 conducts simultaneously with transistor 32 in response to a signal from voltage sensor 24, and transistor 36 conducts independently of transistor 32 in response to a signal from current sensor 22. The signal from the voltage sensor 24 determines the on and off times of the drive circuit 10, and a signal from the current sensor 22 controls the duty cycle of the drive circuit 10 in accordance with the following description of circuit operation.

OPERATION OF THE CIRCUIT EMBODIMENT OF FIG. 2

For purposes of illustration, assume initially that the voltage on capacitor 20 is at some value less than a desired predetermined voltage for firing the flash tube of a camera (not shown). The voltage at the intermediate point 71 in the resistive divider network of resistors 68, 70, and 72 is insufficient to bias the negative resistance device 64 into conduction. With device 64 nonconducting, the amplifier transistor 32 in the amplifying network 26 is nonconducting. Accordingly, current sensor transistor 36 is not biased into conduction by transistor 32. Assuming that the current sensor transistor is not biased into conduction by charging current into load capacitor 20, the negative potential of the low voltage battery 28 provides a voltage at point 53 intermediate the divider resistors 48 and 50 sufficient to bias the PNP transistor 56 into conduction. At the start of each cycle of oscillation in the drive circuit 10, the voltage at point 53 is just barely sufficient to bias PNP transistor 56 into conduction. However, the inductor 54, which is coupled to inductor 44 and 42 in a regenerative feedback arrangement on the same core, produces rapid regenerative turn on drive at the base of transistor 56, and transistor 56 is rapidly driven into saturation. At the same time, inductive coupling between inductors 54 and 42 produces no appreciable current in winding 42 because it is limited by the emitter base drop of transistor 12 and by resistor 40.

Transistor 12 is turned on by the emitter current of transistor 56 and transistor 56 remains on until inductor 46 becomes saturated by the energy transferred from inductor 44.

When inductor 46 is driven to saturation, it undergoes a rapid reduction in reactance, thus robbing transistor 56 of base drive and turning the transistor off. When transistor 56 turns off, current flowing in windings 42 and 44 reverses and the saturable core inductor 46 is reset in preparation for another cycle of oscillation in the drive circuit 10. Thus, rapid turn off drive for the transistor 56 is provided by winding 44 and turn off drive for transistor 12 is supplied by winding 42. The time during which transistors 56 and 12 are turned on is determined by winding 44 in conjunction with saturable core inductor 46. Transistors 56 and 12 are not turned on again until the current reversal of winding 44 has reset the saturable core inductor 46 and current has ceased flowing in the winding 16 and in transistor 36.

When transistor 12 turns off, energy stored in winding 15 is transferred to winding 16 and provides a charging current to load capacitor 20. The charging current for load capacitor 20. The charging current for load capacitor 20 is rectified by diodes 60 and 62, and these diodes are connected to the base of the current sensor transistor 36. The current sensor transistor 36 is connected in a series loop with diodes 60 and 62, winding 16 and the load capacitor 20 and the current sensor transistor 36 responds to the charging current through load capacitor 20 to vary the duty cycle of the drive circuit 10, as previously explained. When current sensor 36 conducts, point 51 between resistors 50 and 52 is clamped to the $V_{CE(SAT)}$ of transistor 36 and transistors 56 and 12 are rendered nonconducting.

When the load capacitor 20 is charged up to the predetermined regulated voltage, the negative resistance device 64 will conduct and turn on transistors 32 and 36 which in turn, turn off the oscillator drive circuit 10 until such time that the voltage at point 71 is insufficient to maintain negative resistance device 64 conducting. When device 64 turns off, transistors 32 and 36 are also turned off and the drive circuit 10 will oscillate once again.

The novel circuit connection of the voltage sensor insures that the negative resistance device 64 turns on rapidly once the voltage across load capacitor 20 reaches the predetermined regulated level. The capacitor 66 charges slowly through resistors 70 and 72 until the voltage at point 71 is sufficient to fire the negative resistance device 64. At this time the capacitor 66 discharges through the negative resistor device 64 to provide a sharp turn on of the device 64. In the absence of capacitor 66, turn on drive current for device 64 would be required from load capacitor 20 through resistors 70 and 72 and such requirement would cause an undesirably large fluctuation of voltage across the load capacitor 20. By using the capacitor 66, such fluctuation across load capacitor 20 is eliminated and a sharp turn on and turn off for controlling the on and off times of the drive circuit 10 is provided.

The following table lists values of components used in a cricuit of the type described with reference to FIG. 2 which has been suucessfully built and operated. However, these values should not be construed as limiting the scope of this invention.

TABLE

Components:

Resistors—

| | Value |
|---|---|
| R30 ohms | 39,000 |
| R34 do | 100 |
| R38 do | 1,000 |
| R40 do | 7,500 |
| R48 do | 270 |
| R50 do | 150 |
| R52 do | 120 |
| R68 do | 390,000 |
| R70 do | 2,000,000 |
| R72 do | 1,000,000 |

Capacitor—

C66 ............ 0.2 μfd., 100 v.

Transistors—

| | Type |
|---|---|
| 12 | H2259. |
| 32 | MPS6520. |
| 36 | MPS3638A. |
| 56 | EL262, hfe ≥40, $I_c=0.5$ amp., $V_{CE}=0.5$ volt. |

Diodes—

| | |
|---|---|
| 60 | MR814 |
| 62 | MR814 |

Voltage supply—

28 ............ Nickel cadmium cell 2 volts.

I claim:

1. A DC to DC converter including, in combination: a drive circuit, a power stage coupled between said drive circuit and a load capacitor and operative to produce a charging current to said load capacitor in response to a driving signal from said drive circuit, voltage sensing means connected between said load capacitor and said drive circuit and responsive to the voltage across said load capacitor to provide a signal at said drive circuit to thereby regulate the voltage on said load capacitor and maintain the load capacitor voltage within a narrow range, and current sensing transistor means connected in series with and in the current charge path of said load capacitor, said current sensing transistor means also connected between said power stage and said drive circuit for controlling the duty cycle of said drive circuit, said current sensing transistor means causing said power stage to provide a variable charging current to said load capacitor, said variable charging current being a function of the voltage on said load capacitor to thereby transfer energy from a low voltage storage cell to said load capacitor at an optimum rate which is inversely proportional to the voltage across said load capacitor.

2. The converter defined in claim 1 wherein: said drive circuit includes a transistor connected to said power stage and operative to provide a periodic driving signal to said power stage, and said current sensing transistor means includes a current sensing transistor connected between said transistor in said drive circuit and said load capacitor; said current sensing transistor responsive to a charging current through said load capacitor to vary the duty cycle of the drive circuit by controlling the conductivity time of said current sensing transistor.

3. The converter defined in claim 1 wherein said power stage includes:

a power transistor connected to said drive circuit and biased into conduction by pulses from said drive circuit, transformer means coupled to said drive transistor, and rectifier means coupling said transformer means to said load capacitor for providing a rectified charging current to said load capacitor.

4. The converter defined in claim 1 wherein said voltage sensing means includes a negative resistance device connected between said load capacitor and said drive circuit and responsive to the voltage across said load capacitor to provide a control signal at said drive circuit to control the on-off time thereof.

5. The converter defined in claim 4 wherein said voltage sensing means further includes:

a voltage divider network connected in parallel with said load capacitor, and a firing capacitor connected between a point on said voltage divider and a point of reference potential, said firing capacitor connected to said negative resistance device for providing a firing current therethrough when said load capacitor charges to said predetermined voltage.

6. The converter defined in claim 5 which further includes inductive couplings means connected between two electrodes of said transistor in said drive circuit and responsive to current flowing in said last named transistor to rapidly drive said last named transistor into saturation and energize said power transistor.

7. The converter defined in claim 6 wherein said inductive coupling means includes:

a first inductor connected between base and emitter electrodes of said transistor in said drive circuit, said first inductor rapidly driving said transistor in said drive circuit into saturation, and a second, saturable inductor connected in parallel with said first inductor and driven thereby to a saturated state by current flowing in one direction in said first inductor to determine the turn off time of said transistor in said drive circuit; the current flowing in said first inductor resetting said second inductor when the direction thereof is reversed.

8. The converter defined in claim 7 which further includes:

amplifying means connected between said voltage sensing means and said drive circuit; said amplifying means further connected to said low voltage DC supply and providing turn off signal at said drive circuit when said load capacitor charges to said predetermined voltage.

References Cited

UNITED STATES PATENTS

| 2,977,524 | 3/1961 | Lingle | 320—1 |
|---|---|---|---|
| 3,196,335 | 7/1965 | Williams | 321—2 |
| 3,274,478 | 9/1966 | Houmann et al. | 321—18 |
| 3,373,334 | 3/1968 | Geisz et al. | 321—2 |
| 3,421,069 | 1/1969 | Minks | 321—19 X |

BERNARD KONICK, Primary Examiner

J. F. BREIMAYER, Assistant Examiner

U.S. Cl. X.R.

321—2, 15, 18; 323—4, 9